United States Patent [19]

Falk

[11] Patent Number: 5,255,352
[45] Date of Patent: Oct. 19, 1993

[54] MAPPING OF TWO-DIMENSIONAL SURFACE DETAIL ON THREE-DIMENSIONAL SURFACES

[75] Inventor: Edward K. Falk, Rockford, Mich.

[73] Assignee: Computer Design, Inc., Grand Rapids, Mich.

[21] Appl. No.: 949,741

[22] Filed: Sep. 23, 1992

Related U.S. Application Data

[63] Continuation of Ser. No. 389,017, Aug. 3, 1989.

[51] Int. Cl.$^5$ ............................................. G06F 15/72
[52] U.S. Cl. .................................... 395/125; 395/127
[58] Field of Search ................ 364/522; 395/125–127; 340/729

[56] References Cited

U.S. PATENT DOCUMENTS

| | | | |
|---|---|---|---|
| 3,621,214 | 11/1971 | Romney | 364/522 |
| 4,796,201 | 1/1989 | Wake | 395/125 X |
| 4,888,713 | 12/1989 | Falk | 364/522 |
| 4,899,293 | 2/1990 | Dawson et al. | 364/522 X |
| 4,899,295 | 2/1990 | Nonweiler | 364/522 |
| 4,928,233 | 5/1990 | Millis | 364/522 |
| 4,930,092 | 5/1990 | Reilly | 364/522 |
| 4,974,177 | 11/1990 | Nishiguchi | 364/522 |

OTHER PUBLICATIONS

Procedural Elements for Computer Graphics, David F. Rogers, pp. 354–363 (Mcgraw-Hill 1985).
"Survey of Texture Mapping", Tutorial: Computer Graphics: Image Synthesis, Paul S. Heckbert, pp. 321–332 (IEEE Computer Society Press 1988).
"Solid Texturing of Complex Surfaces", Computer Graphics, vol. 19, No. 3, Darwyn R. Peachy, pp. 279–296 (Association for Computing Machinery 1986).
"The Syntheses of Cloth Objects", Computer Graphics, vol. 20, No. 4, pp. 49–54 (Association for Computing Machinery 1986).
"A Fast Shaded-Polygon Renderer", Computer Graphics, vol. 20, No. 4, pp. 95–101 (Association for Computing Machinery 1986).
"Mapping Methods for Generating Three-Dimensional Meshes", Computers in Mechanical Engineering, Aug., 1982, W. A. Cook and W. R. Oakes, pp. 67–72.
"Texture and Reflection in Computer Generated Images" by James F. Blinn and Martin E. Newell, University of Utah Oct. 1976.

Primary Examiner—Mark K. Zimmerman
Attorney, Agent, or Firm—Edgar A. Zarins; Malcolm L. Sutherland

[57] ABSTRACT

A system and method for providing surface detail to mathematically defined three-dimensional surfaces which preserves the specific dimensional integrity of the surface detail image being mapped to provide dimensionally correct surface detail. This is accomplished by performing the intermediate step of mapping the surface detail image to a two-dimensional flattened pattern piece representation of the surface and thereafter mapping this representation to the three-dimensional surface. The system and method of the present invention may be used as one function of a greater three-dimensional computer aided design system for any industry which utilizes flat sheets of material formed or assembled into a finished product including textiles, apparel, footwear, upholstered furnishings, automotive or interior design.

11 Claims, 5 Drawing Sheets

MAPPING OF TWO-DIMENSIONAL SURFACE DETAIL ON THREE-DIMENSIONAL SURFACES

This is a continuation of copending application(s) Ser. No. 07/389,018 filed on Aug. 3, 1992.

BACKGROUND OF THE INVENTION

I. Field of the Invention

This invention relates to computer-aided design (CAD) systems and, in particular, to a system and method for providing dimensionally correct mapping of two-dimensional ("2-D") surface detail to a three-dimensional ("3-D") surface in a design system in order to eliminate distortion found in prior known systems. The present invention has specific applications to the apparel, footwear, furniture, automotive or interior design industries.

II. Description of the Prior Art

In the field of computer-aided design, one of the objectives is to display a realistic image of the object displayed on the graphic visual output device, e.g., the cathode ray terminal ("CRT") of the system. A method for enhancing the realism of the displayed image of the object is the addition of detail to the surfaces making up the object using texture mapping techniques. Such texture mapping techniques have been employed in other 3-D CAD systems, notably those used in making computer-generated animated films. The objects designed on and displayed by such systems are represented internally as surface data structures that reflect the 3-D topology of the object. The texture mapping algorithms incorporated into those systems use that topology as a guide for applying the texture over the surfaces making up the object displayed. The two major steps in performing texture mapping are computing the map, and displaying the mapped image. Computing the mapping typically involves a transformation from the 2-D coordinate space of the texture to the coordinate system defined over the 3-D surface, typically a 2-D parameterization of the surface function, which implicitly defines the map to the 3-D surface itself. See *Procedural Elements for Computer Graphics* by David F. Rogers, pp. 354–363 (Mcgraw-Hill 1985) and "Survey of Texture Mapping" by Paul S. Heckbert, pp. 321–332, *Tutorial: Computer Graphics: Image Synthesis*, K. Joy, C. Grant, N. Max, and L. Hatfield eds., (IEEE Computer Society Press 1988). These references give thorough discussion to the problem of displaying the mapped image, which involves, once the map is performed, transforming the texture information from the 3-D object space to the 2-D screen space. Issues covered in the references center around the transformation to screen space and filtering the texture to reduce aliasing (jagged) artifacts in the final image. The mapping function may also be defined differently. For example, rather than mapping to a 2-D parameterization defined on a surface, a ,solid texture, function may be defined for every 3-D point through which a surface passes. This is very effective for simulating objects carved from such materials as wood and marble. See "Solid Texturing of Complex Surfaces" by Darwyn R. Peachy, and "An Image Synthesizer" by Ken Perlin, both in Computer Graphics, Vol. 19, Number 3, *Proceedings of SIGGRAPH* (Association for Computing Machinery 1985), pp. 279–296.

By way of example, in the apparel industry a pattern piece for a part of a garment designed on a CAD system may be represented by a 3-D mathematical surface, typically a parametric spline surface that exhibits an inherent 2-D parameterization. As outlined in the above references, conventional texture mapping algorithms would exhibit a linear mapping from the (u,v) orthogonal coordinate system of the texture to the (s,t) orthogonal coordinate system inherent in the parametric spline surface. The texture mapped, then would consist of a strictly rectangular block of the texture image distorted and projected onto the surface. A technique for flattening 3-D surfaces into 2-D pattern pieces in a 3-D CAD system with applications to soft goods industries is disclosed in U.S. Pat. No.. 5,107,444 issued Apr. 21, 1992 assignee's co-pending U.S. patent application Ser. No. 07/243,616 entitled "Method And Apparatus For Flattening Three-Dimensional Surfaces" (Chien Tai Wu) incorporated by reference herein. This application discloses a system in which a 3-D surface, representing a pattern piece for apparel, footwear, upholstery, or any other soft goods article composed of sheets of flexible material, may be flattened to a 2-D representation of the outline needed for the cutting the pattern piece from a larger sheet of material. In other words, the 3-D surface representation is "unfolded" to a flat 2-D representation It is the relationship between a 3-D surface and its corresponding 2-D flattened pattern piece that the present invention uses to generate a realistically mapped image. Any situation where this relationship exists is suitable for use with the current invention. A situation where there may be a 3-D surface to 2-D flattened piece relationship may be where a 2-D piece is deformed into a 3-D ruled surface with the same surface area. Another possibility is described in "The Synthesis of Cloth Objects" by Jerry Weil in Computer Graphics, Vol. 20, Number 4, *Proceedings of SIGGRAPH* (Association for Computing Machinery 1986), pp.49–54, where a 2-D piece of cloth may be deformed using a computer simulation in 3-D to display the 'drape' of a piece of cloth. In this case, the draping simulation based on a given flat pattern shape will yield a 3-D mesh of points, through which an interpolating 3-D parametric surface may be fit. In these cases we still have the relationship between the 3-D surface and the 2-D flattened pattern piece cut from a flexible sheet of material, all of which may be used in conjunction with the current invention.

If the sheet of material is a textile, the image of that textile may be captured digitally and stored in a computer using well-known scanning methods, and this bitmap image may then be used as the 2-D bitmap image for the texture mapping. Traditional texture-mapping methods would only display a precise 3-D mapped image of the object when the flattened pattern piece of the 3-D surface is perfectly rectangular. Such methods are inadequate for the general case of 3-D pattern pieces with non-rectangular flattened pattern shapes.

SUMMARY OF THE PRESENT INVENTION

The present invention overcomes the disadvantages of the prior known systems by providing dimensionally correct 2-D texture mapping to 3-D object space when the objects displayed are soft goods. The algorithm of the present invention maps a 2-D texture function to a 2-D parameterization defined over a 3-D surface with an additional mapping step for such soft goods.

Once a 3-D object consisting of pattern pieces has been created and displayed on the graphic output device or CRT of a 3-D CAD system and the surfaces comprising the object have associated with them 2-D flattened pattern pieces created via a process substantially similar to that outlined in assignee's co-pending application to Wu or by other means, the present invention provides the user the capability to correctly apply, using a texture mapping technique, any bitmap image to the surfaces comprising the object. The present mapping process utilizes the flattened pattern pieces and maps texture pixels within 2-D polygonal elements to impart a 3-D appearance to the surface that is projected onto the screen of the graphic CRT creating a visually and dimensionally correct display of the object on the screen. Thus, while the flattening process of Wu creates 2-D pattern pieces, the present invention maps the color/texture pixels to create a realistic 3-D image on the screen including appropriate curvature and shading. The ultimate visual result for each pattern piece is as if the flattened pattern piece had been overlaid on the bitmap image comprising the texture, and only that portion of the bitmap image lying within the boundaries of the 2-D flattened pattern piece had been texture-mapped to the 3-D pattern piece surfaces. A conventional texture-mapping technique would typically map a rectangular portion of the bitmap image to the 3-D surface, a distorted result that is not visually correct where the flattened representation of the surface is a shape other than strictly rectangular. The current invention gives the impression of having treated the bitmap image as a bolt of fabric or other flexible material, and using the flattened pattern piece as the boundary for 'cutting out' a portion of the image, and mapping it to 3-D to assume the shape of the surface using the texture mapping technique.

In the case of the apparel industry, computer software programs called 'marking systems' allow the operator to lay out flat pattern piece boundaries on a conceptual rectangular bolt of fabric. Output from these systems is used to drive computer-driven cutting machines to actually cut the pieces from large bolts of fabric. The present invention would give a user, for the first time, the capability to see an accurate computer representation of a fabric pattern such as stripes or prints, positioned on a garment or upholstered piece given a certain layout of the flat pattern pieces on a bolt of fabric. A sophisticated user interface to the present invention may be envisioned where a user may rearrange the flat pattern pieces on the computer representation of the bolt of fabric, displayed as a bitmap image that will be used for the texture mapping, until the mapped textures on the 3-D garment are positioned correctly based on the user's discretion. The data concerning the flat pattern pieces' relative positions on the bolt of fabric may be supplied to a marking system, thus feeding the cutting process. The garments actually sewn from the pattern pieces cut based on this data will then visually appear identical to the representation that appeared on the computer screen, down to the relative positioning of any stripes or pattern in the textile itself.

Similar design advantages are offered to users in industries dealing with upholstered goods, such as upholstered furniture or automotive seat covers where 3-D representations of surfaces making up the object are available. In this case, the surfaces represent the pieces of upholstery used as the outer covering of the finished product. These surfaces, along with their flattened pattern piece representation and a bitmap image representing the upholstery that the pieces are to be cut from, serve as data used by the present system. The user is provided with an accurate visual representation of the upholstered product on the screen of the computer in order to verify the design and positioning of the pattern pieces on the bolt of fabric before any pieces are actually cut and sewn.

Similar design advantages may be realized to users in other industries. These include mapping pieces of leather or other materials for making footwear, placing decals or designs on automotive exteriors or other products that may be represented on a computer, or mapping textiles used on curtains in an interior design application. The present invention has an application wherever a sheet good requires an accurate visual computer generated representation when formed into a 3-D product.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Although the current invention has particular application to the apparel and upholstered goods industries and the descriptions herein may contain references to those applications, it should be understood that the invention may be applied in any application involving 3-D objects containing parts that have been made or formed from 2-D (flat) component materials.

For purposes of this description, there are a few assumptions made about the nature of the surfaces making up the 3-D objects being displayed on the graphic CRT's of the CAD systems and of the bitmap images used for the texture mapping process.

A 3-D surface that represents part of the overall 3-D object is assumed to have defined over it a 2-D parameterization, meaning that for every distinct point on the entire surface there are unique parameters s and t in the orthogonal coordinate system of the surface defining that point. There are several parametric surface types used widely throughout the CAD industry. Among them are NURBS (Non-Uniform Rational B-Spline), Bezier, Hermite, Coons, cardinal, and parametric spline surfaces. Any of these would be suitable for use with the present invention. The only real requirement for the surface type used is that it must be possible to compute a mesh consisting of 3-D points lying in the surface. These mesh points would then be the vertices of polygons that, taken all together, approximate the entire surface by discrete facets. Parameterized surfaces present a well-defined way for generating these vertices;

imagine a set of evenly spaced isoparametric lines in s defined over the surface and another group of evenly spaced isoparametric lines in t. The intersections of the s lines with the t lines form a regularly spaced grid of (s,t) points in the parameter space of the surface. Evaluating the surface at each of these (s,t) points gives us the 3-D (x,y,z) coordinates of the surface at each of these points. The more closely the (s,t) grid points are spaced, the more closely a polygonal mesh made from the resulting (x,y,z) vertices will approximate the surface in 3-D space. The polygons resulting from the discretization of the surface are used by the flattening algorithm as detailed in the co-pending Wu application, as well as input to the texture mapping function. As can be inferred here, the only requirement on a surface type is that a polygonal mesh that suitably approximates the surface may be generated to serve as input to the flattening and texture mapping processes. Parametric surfaces provide a well-defined way of creating this. The parametric surfaces themselves may be created using a 3-D design system that is able to mathematically interpolate or approximate a series of digitized points or curves, which may have been produced by a user via a design function or an outside source, such a 3-D digitizer.

The bitmap images that are used by the texture mapping function consist of a rectangular array of individually colored picture elements called pixels. For purposes of this description, each pixel color consists of a mixture of red, green, and blue component colors, and each of these components may be one of 256 different intensities. Thus, there are 16,777,216 colors that each pixel may have for purposes of this description. In a computer system that is not capable of this many simultaneously displayable colors, degradation of the image may be apparent to some degree if used as a vehicle for the expression of this invention. In cases where there is a regular repeating pattern in the textile or other material to be mapped to the 3-D surface, the bitmap image need only contain strictly one repeat; the entire texture mapped to the 3-D surface will then consist of a plurality of many of these smaller bitmap images assembled into a rectangular pattern to form one composite image large enough to contain the entire flattened pattern piece used as a guide to map the texture to the 3-D surface. The source of these bitmap images may have been video camera input, scanner input, or they may have been designed using other facilities. Those facilities may be "paint" programs, fabric weaving programs, patterning programs, or some other functions in a standard 2-D CAD system. A technique for creating woven fabric images on a computer screen using a 2-D CAD system is disclosed in another co-pending U.S. patent application Ser. No. 07/243,690 now U.S. Pat.. No. 5,016,183 issued on May 14, 1991 for a TEXTILE DESIGN SYSTEM AND METHOD (Emory Shyong), assigned to the assignee of the present application.

Once a user of the system has stored 3-D surfaces and 2-D bitmap images, the present invention requires that there be flattened pattern pieces corresponding to the surfaces. These may be generated by the process detailed in the Wu application, or associated flattened pieces may be obtained via another technique. This process may be part of the 3-D CAD system that the user is operating, or the flattened pattern pieces may have accompanied the surfaces from an external source. When the user selects a particular bitmap image to be mapped on a particular 3-D surface, the present invention will use the flattened pattern piece corresponding to the 3-D surface to compute the precise mapping of the pattern texture to the 2-D flattened pattern piece, and then from the 2-D flattened pattern to the 3-D surface. Once the map is computed, the software will then produce an accurate texture-mapped image of the surface displayed on the graphic CRT of the CAD system. Additionally, this image may be output to hardcopy media via an output device such as a camera or color printer. The texture mapped on the 3-D surface will then appear as if a portion of the texture in the shape of the outline of the flattened pattern piece had been cut out and formed into the shape of the 3-D surface comprising that part of the object.

Description Of The Hardware

The hardware requirements to support this function are basically those needed to support a 3-D CAD and image processing system. An illustration of such a system is given in FIG. 1. The hardware should consist of, minimally, a graphic CRT 10 with a light pen 11 or mouse 12 as a locating instrument, a keyboard 14, a central processing unit 16 that supports program control of the individual pixels displayed on the graphic CRT, and a hard disk storage unit 18. If the bitmap images used in the system are to be input via video, a video camera 20 and associated frame-grabbing hardware 22 are also required. Alternately, the bitmap images may come from an image scanning device 24. The disk storage 18 is needed for storage of the data files supporting the 3-D software system including the geometry for the 3-D surfaces, the geometry for the corresponding 2-D flattened pattern pieces, and the bitmap images stored for application as surface detail to the 3-D surfaces. For all geometric computations, the computer should support floating-point mathematics computation. Another consideration is the number of simultaneously displayable colors possible on the graphic CRT 10 of the computer system; a minimum of 4096 simultaneously displayable colors and preferably 16.7 million would be needed in a system with video camera input and colorization or texture mapping performed by the software.

A version of the software herein described is currently supported on a Silicon Graphics Inc. IRIS 4D/70 workstation, currently configured with a keyboard, three-button mouse, graphic CRT with a viewable resolution of 1024 by 1280 pixels, a central processor with 8 megabytes of main memory, 380 megabyte hard disk, 24-bit Z-buffer for hidden surface elimination, and a 24-bit frame buffer supporting 16,777,216 simultaneously displayable colors on the graphic CRT. Scanned images used as textures are supported using a desktop scanner manufactured by Howtek, Incorporated. This is a usable configuration; a computer configured with greater viewable resolution would allow this software to be modified to give better visual results.

Description Of The Software

In describing the functions of the present invention involved in accurately applying 2-D bitmap images as surface detail to 3-D surfaces, a few different groups of functions need to be detailed. First, data must be prepared for the function to process; briefly described here will be processes that may be used for creating 3-D surfaces, a discrete approximating polygonal mesh, the corresponding flattened pattern pieces, and a bitmap image to be applied as surface detail. A process whereby a user may position a texture relative to a flattened pattern piece will then be described. This process is important in that it is similar to the methods used in 'marking systems' currently in wide use in textile related industries. As such it is not part of the current invention, but this process serves as a natural front-end to tailor the invention to the needs of these industries. Finally, the process of actually using the present invention and the results produced will be described.

Figure 1:
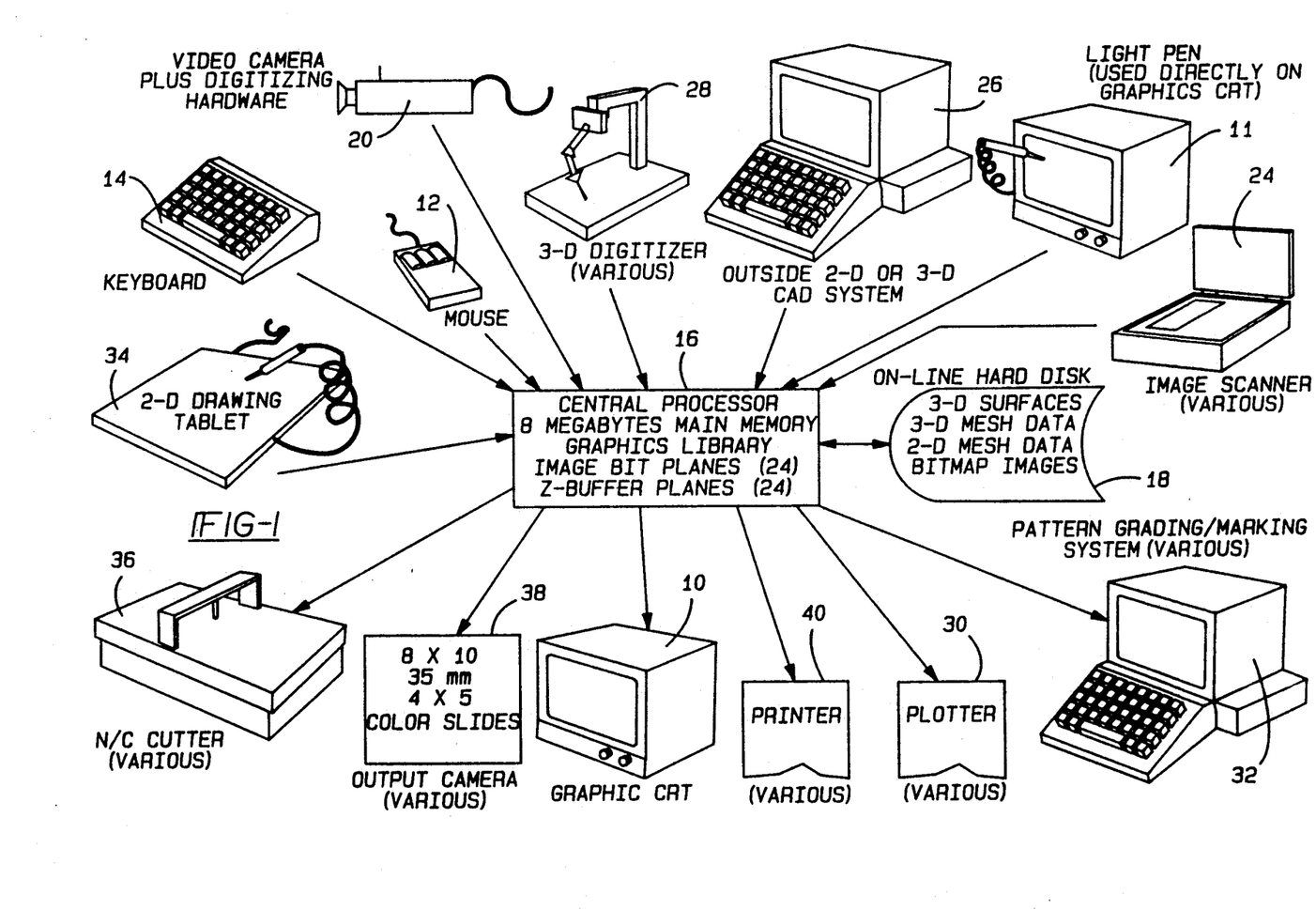
FIG. 1 is an illustration of a computer-aided design hardware system of the type that may be used in conjunction with the present invention.

The 3-D surfaces suitable for use with the present invention may be created using a variety of methods. For purposes of this description, techniques for creating B-Spline (a subset of NURBS) surfaces will be described. These may be mathematically converted into Bezier, Hermite, and other forms. A B-Spline surface shape is controlled by the position in 3-D space of a mesh of control vertices. These do not necessarily lie in the surface, but the surface lies in the convex hull defined by the control point mesh. Techniques for creating B-spline surfaces that directly interpolate meshes of data points have also been published. This allows a B-Spline surface to actually represent a mesh of digitized data points placed in 3-D space using a 3-D CAD system 26 or obtained from an outside source such as a 3-D digitizer 28. When using a 3-D CAD system, a user may specify all of the points that a surface is to interpolate, or it may be sufficient to simply digitize points forming the boundary and to mathematically compute the points to be interpolated in the interior using a meshing technique. Many 3-D CAD systems allow a user to manipulate, directly or indirectly, the 3-D coordinates of the control points or data points used for defining a 3-D surface until the user is satisfied with the shape. At this point the user may store the geometry defining the surface in a file on the computer's hard disk drive or other storage media for later use or review. For purposes of the current invention, the desired shape of the surface maybe that of a single pattern piece of a 3-D model of an item of apparel, or that of a single piece of upholstery forming a section of a chair or other upholstered object. The surface detailed by the present invention may be obtained from an outside source, such as another CAD system 26.

Creating a mesh of polygons to approximate a parametric surface is a technique used by some CAD systems to display the surface on the graphic CRT of the computer; since the graphics capability of many engineering workstations supports polygons, subdividing the surface into polygonal facets is a natural step. From the user's viewpoint, it will usually coincide with the creation of the surface. Basically, an arbitrary number of evenly space U values within the U boundaries and V values within the V boundaries of the surface are computed. Generating every (U,V) pair combination will then generate a grid of points in the (U,V) space of the surface, evenly spaced in U and V. For every (U,V) pair generated, evaluate the surface function at the (U,V) point, computing a 3-D (X,Y,Z) point. The series of 3-D points will then serve as polygon vertices for a mesh of 4-sided polygons that as a whole approximate the surface. The more finely the spaced (U,V) subdivisions are computed, the better the approximation to the actual surface. Once computed, the 3-D mesh geometry may be stored with the corresponding surface as a file on the computer's hard disk drive 18 or other storage media for later use. For purposes of the present invention, since both the flattening and texture mapping herein described only require the polygonal mesh as input, the mesh itself may have been supplied by an outside source such as another CAD system 16 serving as the sole geometric input to this software.

The flattened pattern pieces used as a guide for mapping the texture are created from the approximating polygonal mesh for the surface. The method employed projects the 3-D polygons into 2-D, retaining their 3-D shape as much as possible while assembling them into a 2-D polygonal mesh. The algorithm attempts to keep the polygonal edges or ,links, the same length as they were in 3-D. If the surface is developable (a ruled surface or one that was flat to begin with) the 2-D link lengths will be identical to their lengths in 3-D. If the surface is not developable, (a surface with Gaussian curvature) the flattened pattern piece will contain regions where the links are shorter (under compression) and/or regions where the links are longer (under tension) than their original length in 3-D. When the flattening software is being used as a part of a larger 3-D CAD system, this typically involves having the image of the 3-D object composed of the surfaces to be flattened displayed on the graphic CRT 10 of the computer system. The user interface for flattening the 3-D surfaces to 2-D pattern pieces simply involves having the user invoke the flattening by selecting the ,Flatten, option from an on-screen menu displayed by the CAD system, followed by selecting the surfaces to be flattened from the image of the 3-D object displayed on the graphic CRT of the computer with the locating device. The flattening will then take each of the selected surfaces in turn and generate the corresponding 2-D polygonal mesh. For every 3-D polygon in the mesh approximating the 3-D surface, there is a corresponding 2-D projection of that polygon contained within the flattened 2-D mesh. The user, who will typically be using the pattern piece as data to drive a plotter 30 or a pattern cutting system 32 is usually only interested in the border or outline of this flattened pattern piece. The current invention, however, requires all of the information contained within this flattened projection of the relative positions and shapes of the 2-D polygons making up the entire 2-D mesh. Once computed, the 2-D flattened pattern piece mesh geometry may be stored with the corresponding 3-D mesh as a file on the computer's hard disk drive 18 or other storage media for later use. For purposes of the present invention, the 2-D mesh may have been supplied by an outside source such as another CAD system 26. The 2-D flattened mesh may simply accompany its corresponding 3-D polygonal mesh as input to the software program of the present invention.

The bitmap images may be created by several means. Computers employing raster display systems for creating images on the graphic CRT use elements called pixels as the basic element of the display. A 'paint' program allows a user to specify the color of individual pixels or groups of pixels on the screen of the computer using software design tools that are familiar to an artist or designer. A fabric weaving program may also be employed. Although this weaving system creates the engineering specifications for creating a woven fabric, it also creates a bitmap image of the simulated woven fabric on the screen of the computer, which is of use in the present invention. Images may also come from an outside source such as a video camera 20 or flatbed scanner 24. Both of these types of devices essentially take electronic 'photographs' of an object; the image of this object is supplied to the computer as an array of pixels which may also be displayed on the graphic CRT 10. Regardless of the source, the bitmap image may be displayed as a rectangular array of pixels on the graphic CRT 10 of the computer and it may also be stored as a file on the computer's hard disk drive 18 or other storage media for later use. One requirement is that the real-world size of the bitmap image must be known. The images are stored as arrays of pixels; the image itself may be of a piece of fabric that could have been any size. Part of the design or scanning process for the bitmap image must involve having the user specifying the actual size of the swatch of material being electronically captured in the bitmap image, in centimeters, inches, yards, or whatever unit of measurement is convenient. Given the real-world size of the bitmap image, the software may then compute how many repeats of the swatch of texture may be displayed within the 'marker' boundary on the computer screen, as described later. This will insure that the texture mapped to the 3-D surfaces in turn will be the correct size, relative to the 3-D dimensions of the 3-D object. For a user involved in the apparel or upholstered goods industries, the bitmap image may be a picture of a fabric or piece of upholstery that has been electronically digitized by placing the material in the flatbed scanner 24 and scanning it in to the system. After being mapped, this texture will result in an image that gives a very convincing appearance of a photograph of a 3-D object made out of that material. For purposes of the present invention, bitmap image may have been supplied by an outside source such as another 2-D CAD system 34 employing one of the above techniques.

Once the user has stored in the CAD system both a bitmap and a 2-D flattened pattern piece corresponding to a 3-D surface, the last remaining piece of data required by the present invention is the relative placement of the pattern piece with respect to the image. A reasonable method for doing this is borrowed from the apparel, footwear, and upholstered goods industries by using a 'marking system' capability, with some enhancements. A marking system serves as the front-end to the computer driven pattern piece plotting and cutting processes in these industries. Typically, a user has displayed on the graphic CRT of the computer a large rectangle representing a bolt of fabric or 'marker' and several smaller shapes representing the individual pattern pieces that need to be placed on the marker. Software tools are available for placing and repositioning the pieces on the marker, calculating area covered and percentage waste, along with error checking to make sure no pieces overlap. An interface to the present invention includes the enhancement that the bolt of fabric, rather than being represented by a simple rectangular outline is actually represented by repeats of the bitmap image. The software is able to compute, given the actual dimensions of the fabric swatch represented by the bitmap image, how many repeats of the image must be displayed within the rectangle representing the marker. The system will then size the bitmap image using either an image compressions or expansion technique and display repeats of it to tile (cover) the entire marker rectangle. The impression given is that of a photograph of the actual bolt of fabric. The flattened pattern pieces appear to the user as outlines displayed on top of the bolt of fabric. There are several elements to the user interface of a good marking system capability for placing these pattern pieces. For purposes of the present description, the user may use the software to translate or rotate the pattern pieces with respect to the texture at will, or even modify the texture itself by using the image processing capabilities in a 2-D design system to modify colors, designs, or the size of the texture. The software should have a ,translate, function so that the pattern piece may be moved around relative to the marker and the other pattern pieces placed thereon. A 'rotate' function should also be present allowing the pattern piece to be rotated by a user-specified angle relative to the marker and the other pattern pieces. More sophisticated enhancements to the user interface for piece placement may include allowing for seam allowances at the boundaries of the flattened pattern pieces and error-checking to make sure that the user does not overlap pieces when positioning them on the marker. The user may place two pattern pieces near each other and carefully position the pattern pieces relative to a feature in the texture, such as a stripe, so that when these two pieces are mapped in 3-D, the stripes on the two pattern pieces will line up or be placed is some other desired relative fashion. For purposes of the present invention, information must be supplied concerning the relative size of the image versus the relative size of the flattened pattern piece (a scale factor) relative X and Y offsets from a 'base' position (a translation), and a rotation, with an angle specifying the angular change from an 'unrotated' orientation. Other methods may be envisioned for allowing a user to position a texture for mapping on a 3-D surface. This method has particular application to industries that design objects incorporating textiles or upholstery.

Figure 2:
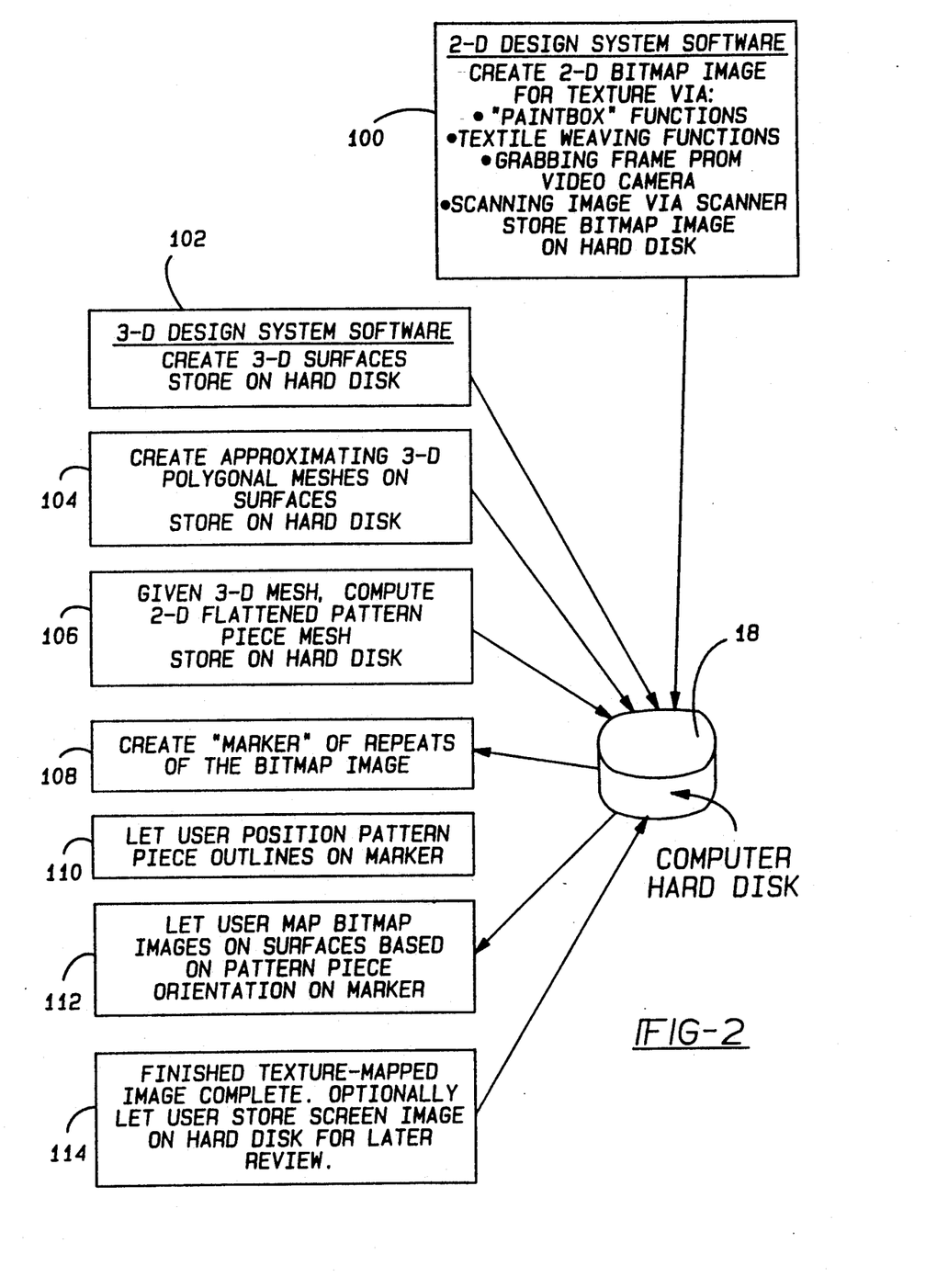
FIG. 2 is a flowchart describing a portion of the 3-D CAD system according to the present invention.

The data required by the current invention is a 3-D mesh of polygons 104, a corresponding flattened 2-D mesh of polygons 106, a bitmap image with a known size of the swatch of material it represents 100, and (X,Y) translations and a rotation angle of the pattern piece relative to repeats of the bitmap image on a 'marker' 112. Once data like this has been gathered in a CAD system by means similar to those described above, the user simply has to specify that the given texture is to be mapped to the given 3-D surface. The user interface for this step usually involves simply selecting the 'Texture Map' option from an on-screen menu displayed by the CAD system, followed by selecting the surfaces to be mapped with the given texture from the image of the 3-D object displayed on the graphic CRT of the computer with the locating device. The texture-mapping function employing the current invention will then apply the bitmap image as a texture to the 3-D surface. The ultimate appearance will be that the portion of the repeats of the bitmap image on the marker contained within the boundary of the pattern piece will be the only part of the texture mapped on the 3-D surface. More specifically, since each 3-D polygon in the polygonal mesh approximating the 3-D surface has as its counterpart a 2-D projection in the flattened pattern piece mesh, the portion of the bitmap image texture strictly lying within this 2-D polygon ultimately is what is mapped to that specific polygon in 3-D using the texture mapping technique. This is the specific technique embodied in the current invention.

Detailed Description of the Software

Referring to FIG. 2, a portion of a 3-D CAD system employing the present invention is illustrated. The steps from surface and image creation through surface flattening, pattern piece placement, and final application of textures using the present invention are outlined.

The process begins with the creation of 3-D surfaces. The surfaces are piecewise parametrically defined surfaces (NURBS, Bezier, Hermite, parametric spline, etc.) that may interpolate or approximate a mesh of 3-D (X,Y,Z) points. These points may be placed in 3-D by the user via software functions contained within this 3-D design system, or they may have been created outside this system, either by a 3-D digitizer 28 or another 3-D CAD system 26. Additionally, parametrically defined surface may be created in another 3-D CAD system and imported to the current system.

Once a parametrically defined surface has been obtained, an approximating 3-D polygonal mesh may be computed 104. The vertices of the polygonal facets making up this mesh lie in the parametric surface. The points are generated by evaluating the surface at all points in an evenly spaced grid of points in the (U,V) parameter space defined over the surface. Once the parametric surfaces and their associated approximating polygonal meshes have been computed, these may be stored on the computer's hard disk for later use.

A 2-D flattened pattern piece mesh may be computed 106 from the 3-D approximating polygonal mesh of a surface using the technique disclosed in assignee's co-pending application to Wu. Every polygon in the 3-D mesh has a 2-D counterpart in the flattened mesh. Once the flattened pattern piece mesh 106 has been created, it may be stored on the hard disk 18 for later use. Additionally, the outline of this pattern piece may be exported to a pattern grading or marking system 32, a plotter 30, or it may be used to drive an N/C cutter 36 in a manufacturing operation.

The bitmap image to be used as a texture by the mapping function may be created in a 2-D design/image processing system 100 by several means. Conventional software ,paint, facilities may be used to design the 2-D images. This type of software mimics an artist's tools for design and may use hardware like a 2-D drawing tablet 34, mouse 12, or light pen 11 interfaced to the computer to serve as input/locating devices to aid the design process. A fabric or textile image may be created using the method disclosed in the co-pending application, referenced above. Additionally, the image may have been obtained by using a video camera 20 or scanner 24 and associated hardware interfaced to the computer. In any case, the result is a rectangular array of pixels of which the user may select all or any portion to be used as the bitmap image 100 for texture mapping. When this is done, the user also must indicate the real-world size of the swatch of fabric, textile, upholstery, or other material that this swatch is supposed to represent, in inches, yards, centimeters, or whatever unit of measurement is convenient. This is needed so that the size of the repeats of the fabric may be accurately scaled for display on the 'marker' and, ultimately, on the 3-D surface. Once the bitmap image 100 has been obtained by the 2-D design system, it may be stored on the hard disk for later use.

Once the 2-D flattened pattern piece and the bitmap image have been created, the present invention provides a tool for positioning and orienting the texture on the surface that is similar to the technique used in 'marking systems' in the apparel and other piece goods industries. Given the bitmap image as one repeat of the pattern or design in a fabric, the software will create an image of the entire bolt of fabric, using the bitmap image to tile or cover the entire fabric area. The user can then, using software tools provided, orient the pattern piece outlines 110 by translating and rotating them over the repeats of the bitmap image within the bolt of fabric or 'marker'. The portion of the repeats of the bitmap image lying within the outline of a given pattern piece outline is the texture that will be mapped to the 3-D surface corresponding to this pattern piece by the texture mapping software incorporating the present invention.

Once there exists a 3-D mesh 104, a corresponding 2-D mesh 106, a bitmap image of known real-world size 100, and an orientation of the 2-D mesh relative to repeats of the bitmap image on the marker 112, the user may then use the texture mapping software employing the current invention to accurately map the bitmap image to the 3-D surface while preserving as much as possible the dimensional integrity of the image when mapped 114. The result is a very accurate representation of the appearance of the object being modeled if made of the fabric or other material chosen for mapping. Several surfaces in the object currently displayed may have the currently selected texture mapped to them by the user selecting them in turn with a locating instrument such as a mouse or light pen from the image of the object displayed on the graphic CRT. If other surfaces require a different bitmap image, the user need only retrieve the new bitmap image as the current image, orient the corresponding pattern pieces with respect to a marker composed if this image, and then select the surface to be mapped with this image with the locating instrument. A helpful, but by no means the only possible user interface to assist this process involves splitting the display on the graphic CRT of the computer into two 'windows'. Displayed in one window is the 3-D object; this is the window where the mapping takes place. The other window contains the pattern pieces placed on the bitmap image ,marker,. The user adjusts the pattern placement on the marker in this window. Once the entire image is mapped, the user should have the option of re-displaying the final mapped image so that it is as large as possible in a full-screen window on the graphic CRT of the computer system. Hardcopy output of the image may be obtained via an output camera 38 or a color printer 40. The functions that actually perform the mapping will be described in more detail below.

Figure 3:
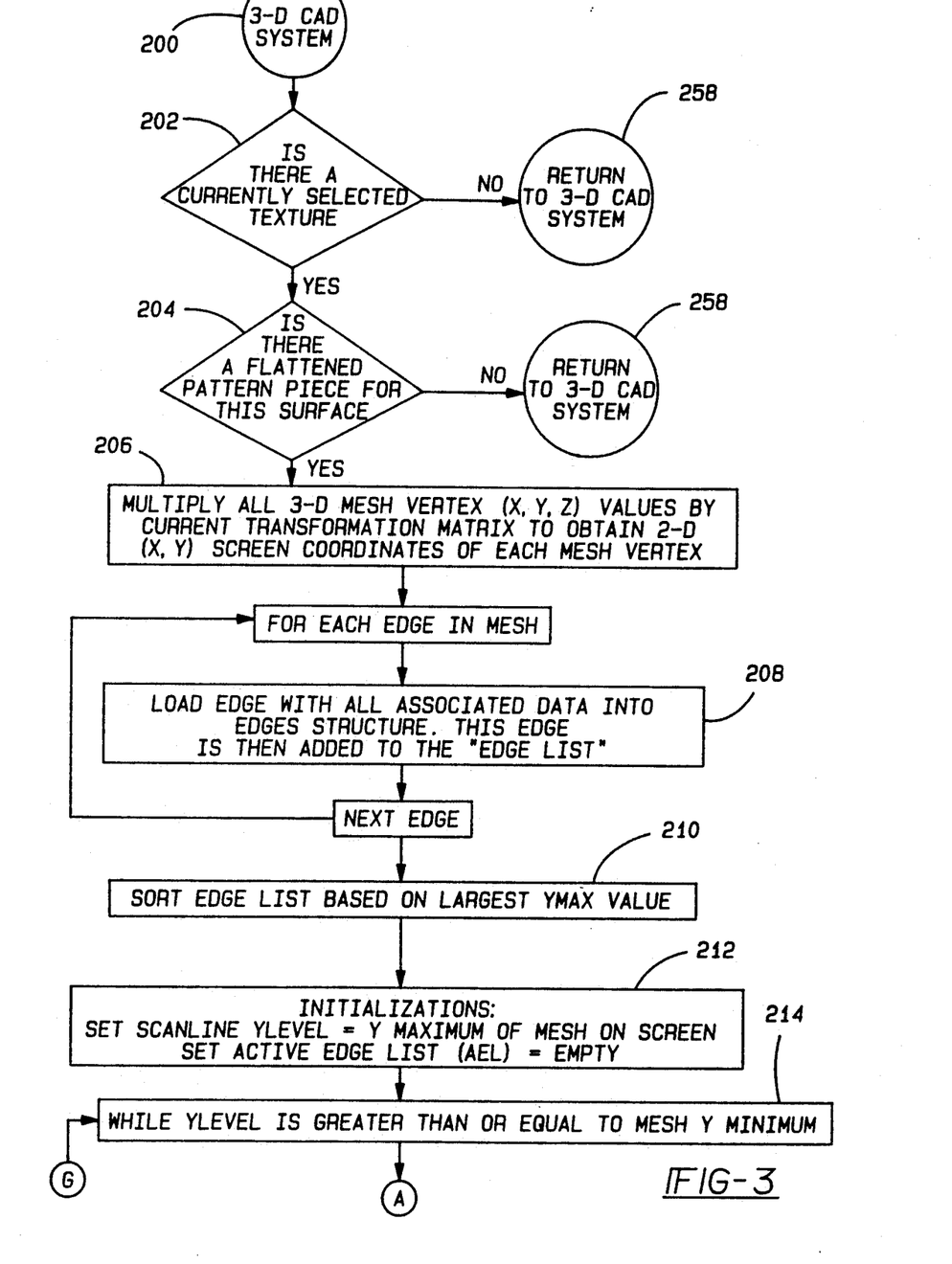
FIG. 3 is a flowchart describing a first portion of the 3-D texture mapping function of the present invention.
Figure 4:
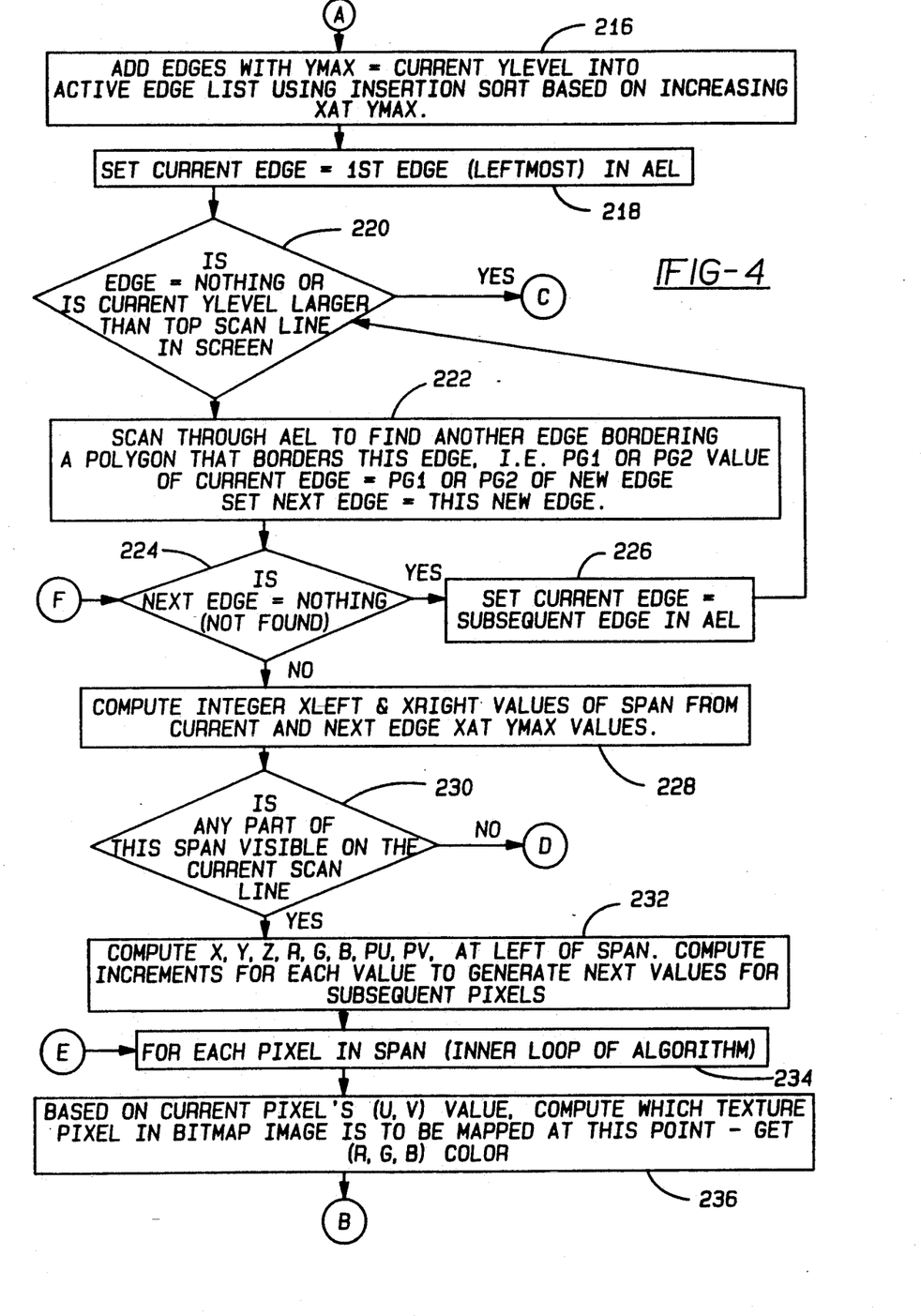
FIG. 4 is a flowchart describing a second portion of the 3-D texture mapping function of the present invention.
Figure 5:
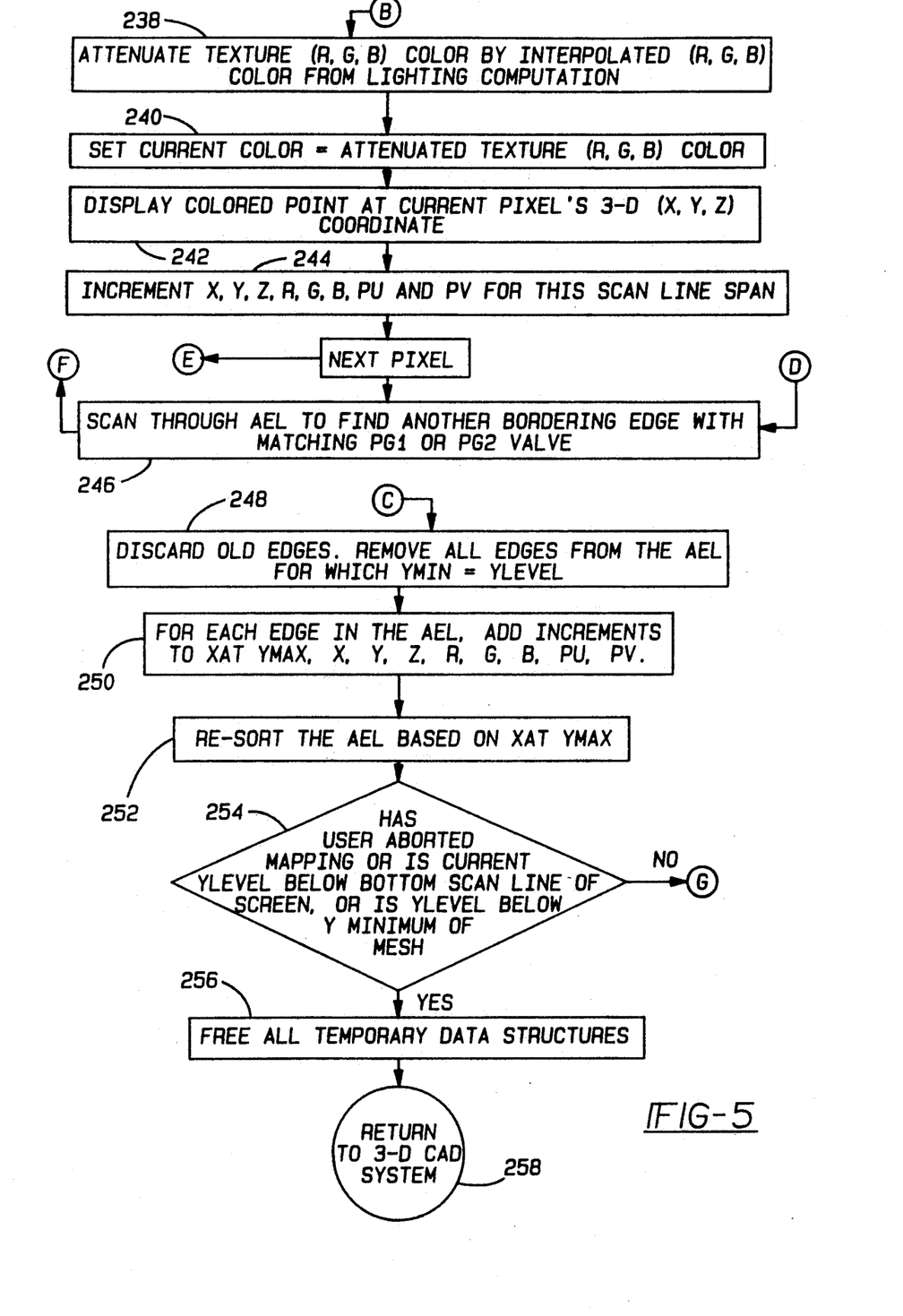
FIG. 5 is a flowchart describing a third portion of the 3-D texture mapping function of the present invention.

The actual texture mapping technique is illustrated in FIGS. 3, 4 and 5. This function requires that the -3-D surface currently selected for mapping has defined over it an approximating polygonal mesh 104, an associated 2-D flattened mesh 106, and that this 2-D flattened piece has been placed and oriented (106-112) with respect to a 'marker' containing repeats of the current texture as a bitmap image representing a swatch of material of known real-world size. Once the user has prepared this data, this function may be selected to map the currently selected bitmap image on the currently selected surface. The algorithm itself is based on an extension of well-known edge list scan conversion and Gouraud shading interpolation techniques. These are methods for filling polygons with pixels on raster or scan-line display devices, with the color or shading in the interior of the polygon being linearly interpolated based on the colors at the polygon vertices.

There are two major improvements to the mapping algorithm of the present invention that deviate from the methods described in the prior art. The first is that the polygons are all scan-converted at once with all of the mesh edges compiled into a single edge list. This has the advantage of being faster, since each edge is incrementally processed only once. If each polygon in the mesh were processed individually, each edge (except for those on the mesh boundary) would be processed twice, once for each polygon on either side of the edge. The second improvement is required to turn the shading algorithm into one used for texture mapping. In addition to the (X,Y,Z) 3-D coordinate and (R,G,B) lighting color values at the polygon vertices being interpolated across the interior of each polygon, a (U,V) coordinate must be interpolated as well. This coordinate is actually a 2-D (X,Y) coordinate in the pixel space of the texture being mapped. Thus, for each pixel in each polygon to be displayed on the screen, there is a 3-D (X,Y,Z) coordinate, a texture (R,G,B) color obtained by computing the nearest texture pixel based on the (U,V) coordinate, and an attenuating (R,G,B) color based on the current lighting model that have to be computed. The (U,V) coordinates in the interior of the polygon are linearly interpolated in the same way that the (X,Y,Z) and (R,G,B) coordinates are, based on the coordinate values at the vertices of the polygon.

The initial computation of these (U,V) coordinates at the polygon vertices is the critical technique employed in the current invention. This computation involves the mapping from the pixels in the texture to the dimensions of the represented texture swatch in the unit of measurement supplied by the user, then to the 2-D (X,Y) mesh vertex coordinates of the flattened pattern piece that has been positioned on the texture 'marker' by the user. Any offset or rotation involved in placing the pattern piece must also be factored into the computations.

Once the user invokes this function from the CAD system and selects a surface to map, the function checks if there is a currently selected texture 202. If none exists, the function will exit. Likewise, if there is no 2-D flattened pattern piece mesh associated with the current surface 204, the algorithm cannot compute the correct map, and also exits. Assuming that these two criteria are met, they will be loaded into temporary data structures for convenient access, and the program will continue. The next step 206 will be to multiply all of the (X,Y,Z) vertex coordinates in the 3-D mesh by the current transformation matrix. This matrix embodies the mapping from 3-D space to screen space, with any rotations, translations, scales, or other viewing transformations that may have been applied to the data to view it on the graphic CRT of the computer. This matrix multiplication is often handled automatically by the graphics subsystem or display processor in many computer graphics displays, and is required here so the mapping algorithm has the data for projecting each mesh polygon into 2-D screen pixels. After the 2-D screen coordinates of all of the mesh vertices have been computed, the minima and maxima of the mesh are computed so that later these may be used in bounds checking to avoid performing unnecessary computations. The (X,Y) minima of the flattened pattern piece mesh in the 2-D texture space are then computed. These will be needed along with the pattern placement offsets for computing the position in X and Y of the pattern piece relative to the texture.

The next step involves setting up the main data structure for the mapping process 208. Each mesh edge connecting two mesh vertices is assigned to an edge structure.

The algorithm for the 3-D texture mapping is an extension of the standard edge-list scan conversion algorithms for filling polygonal shapes in computer graphic displays. As a consequence, an ,edge, structure serves as the primary data structure used by the mapping algorithm. Each mesh edge has one of these structures allocated for it, and the entire list of edge structures is sorted and used as described in the algorithm.

Edge data structure:

ymax, ymin: Y maximum and Y minimum screen coordinates of this edge. The ymax variable is used as the basis for sorting the edges in descending y scan line order in the edge list. During mapping, the scan line ylevel value is decremented by 1 for each scan line. When ylevel becomes equal to ymin during this process, this edge is discarded from the list.

xatymax: Screen coordinate X value at Y maximum of edge xatymaxincr: Increment for xatymax when mapping decrements one scan line x, y, z: The actual (X,Y,Z) coordinate of the top of this edge in 3-D space (top referring to the end with the greater y value in 2-D screen coordinates). Each pixel generated by the texture mapping algorithm is actually submitted to the graphics display as a 3-D colored 'point' so that fast hardware hidden surface elimination may be performed using the Z-buffer.

xincr, yincr, zincr: Increments for x, y, and z when mapping decrements one scan line r, g, b: The color of the light falling on the 3-D surface at the point at the top of this edge. The light is computed based on the position, color, and intensity of the light sources along with the orientation of the 3-D surface at this point. This color is used to attenuate the (R,G,B) colors in the texture when they are mapped.

rincr, gincr, bincr: Increments for r, g, and b when mapping decrements one scan line pu, pv: Actually the 2-D (X,Y) pixel coordinates of the top of this edge in the texture. These values are computed from the placement of the flat pattern piece mesh (2-D edges of mesh polygons) on the array of pixels making up the texture. This coordinate embodies the mapping from the texture to the 2-D pattern piece. This data structure then associates this mapping with the map from the 2-D pattern piece to 3-D.

puincr, pvincr: Increments for pu and pv when mapping decrements one scan line pg1, pg2: Numbers assigned to the two mesh polygons that meet at this edge. These are needed so that as each scan line is processed, the edge that matches the current edge may be determined for proper interpolation.

All of the mesh edge structures taken as a whole comprise the 'edge list' used by the scan conversion mapping algorithm. For each mesh edge, the computed screen coordinates of the endpoints are used to load the ymax, ymin, and yatymax variables. (X,Y,Z) values are obtained from the 3-D approximating mesh of the surface. (R,G,B) color values are obtained via a lighting computation based on the position, color, and intensity of light sources in the current scene along with the direction of the vector normal to the surface at the vertex. The (pu,pv) values are computed from data concerning the bitmap image and the 2-D flattened pattern piece mesh. The required data are the number of pixels in the bitmap image in X and Y along with its real-world dimensions in X and Y, the 2-D (X,Y) coordinates of the polygon vertices in the flattened mesh, the unit(s) of measurement the image dimensions and mesh coordinates are given in, (if different) and the placement of the mesh relative to the bitmap image, i.e. any relative offsets or rotation. The (pu,pv) coordinate encompasses the mapping from the 2-D mesh coordinate to the pixel space of the texture; effectively, this is the 'pixel coordinate' in the 2-D texture space of the given mesh point. The nearest integer values of pu and pv are the indices of the pixel in the texture, the color of which should be displayed at that coordinate when mapped. The scan conversion is an incremental process, and most of the variables in the edge structure require associated incremental variables for their update as the algorithm steps from one scan line to the next, decrementing the current 'ylevel' scan line number. The incremental variables for xatymax, x, y, z, r, g, b, pu, and pv are all computed from the values of the variables at either end of the edge and the number of scan lines crossed by the edge in 2-D screen space so that the intermediate values of these variables may be incrementally generated for each of the edge's scan line intersections. For each subsequent scan line, the increments are simply added to the variables to generate the new value for that scan line. The ymin variable is only used to compare with ylevel after decrementing; when ylevel becomes equal to ymin, the edge is discarded from the edge list. The remaining variables in the structure, pg1 and pg2, are simply polygon i.d. tags. Each polygon in the mesh is given a unique number to identify it; the two numbers in each edge structure are the i.d.'s of the two polygons sharing that edge. As each edge is processed on the current scan line, the active edge list (all edges intersecting the current scan line) may be searched for another edge that borders one of the polygons shared with this edge. If one is found, the pixels between these two edges are generated for this scan line.

After all of the edges have been loaded into the edge list, the edge list is sorted in descending order based on the ymax screen coordinates of the edges 210. This is the preferred order since this texture mapping implementation maps from the top of the screen to the bottom. Since the number of edges in the entire list is potentially very large, care must be used when choosing a sorting algorithm for this step. The algorithm must be efficient for large numbers of elements; for example, it was found in the current implementation that an insertion sort was unsuitably slow, yet the well-known 'Quicksort' algorithm is quite adequate.

Once the edge list has been sorted, the actual mapping may begin. Initializations are performed 212; the current scan line number 'ylevel' is set equal to the maximum Y screen coordinate of the topmost edge in the list, and the 'Active Edge List' (hereinafter abbreviated AEL, the list of edges intersecting the current scan line) is set equal to empty or null. The actual mapping loop 214 continues while ylevel is greater than or equal to the minimum Y screen coordinate of the mesh. The first step 216 in the loop is to take all edges from the top of the sorted edge list with ymax equal to the current ylevel and add them to the AEL using an insertion sort based on increasing xatymax values. The current edge is then set to the first (leftmost; smallest xatymax value) edge in the AEL 218.

This next inner loop will step from edge to edge to find polygon spans on this scan line to interpolate and texture map. At the beginning of this loop, a check is made 220 to see if the current edge points to nothing, or if the current ylevel scan line is larger than the top scan line on the screen (viewport). If either of these is true, this loop is bypassed. If not, the processing continues as follows. The next step 222 is to scan from the current edge through the AEL to find another edge bordering one of the polygons bordered by this edge; i.e. the pg1 or pg2 value of the current edge is equal to either the pg1 or pg2 value of the next edge. If a next edge is not found 224, the current edge is set equal to the immediately subsequent edge 226 with equal or greater xatymax in the AEL, and control passes back to the beginning of this loop. If, instead, a next edge has been found, that means that a polygon span has been found. The integer left and right boundaries of this scan line span are then computed 228 from the xatymax values of the current and next edges and compared with the left and right boundaries of the screen (viewport) to determine if any part of this span is visible. If the span is entirely out of view, the innermost span interpolation loop is skipped. If any part of this span is visible on the current scan line, the span interpolation is performed.

The first step 232 in the span interpolation is to get the x, y, z, r, g, b, pu and pv values from the left edge of the span, and using the values at the right edge of the span and the number of screen pixels crossed by the span, compute the increments for each of these values to generate the new values for each subsequent pixel in the span. Once this is done, the innermost loop 234 in this algorithm, the span interpolation may begin. For each pixel in the span, this loop will perform the following steps. First, based on the pu, pv texture pixel value, the actual pixel index in the bitmap image making up the texture must be computed 236. Since the pu and pv coordinates may be less than zero or greater than the number of pixels in x and y in the bitmap image, (due to the texture consisting of 'repeats' of the bitmap image theoretically tiling all of (U,V) space) the values need to be 'truncated' or wrapped around so that u and v indices are computed that fall within the number of pixels in the x and y dimensions of the bitmap image. Once the nearest integer values of the u and v values are computed, the red, green, and blue color components of the texture pixel (abbreviated Rt,Gt,Bt) at this location are obtained. There are also a red, green, and blue interpolated color components (abbreviated Rl,Gl,Bl) associated with the amount and color of light falling on this portion of the surface. These color values must attenuate 238 each other. The final red, green, and blue values of this pixel are determined by the following equations:

$$\text{red} = \frac{Rt \times Rl}{255} \quad \text{green} = \frac{Gt \times Gl}{255} \quad \text{blue} = \frac{Bt \times Bl}{255}$$

This results in the texture color being attenuated by the current light color falling on this point on the surface. The current color is then set to this computed color 240, and a point 242 at the 3-D (x,y,z) interpolated coordinate in 3-D space. Because this is a 3-D point, the algorithm can take advantage of hardware Z-buffer hidden surface elimination capability offered by the graphics display system. This results in a speed increase for the mapping, as the software does not have to determine the nearest point for each pixel mapped to eliminate hidden surfaces. Once this colored point has been sent to the graphics display, the x, y, z, r, g, b, pu, and pv interpolated values for this span must all be incremented 244. The algorithm proceeds on to the next pixel, continuing this process until all pixels in this span have been mapped.

Once the innermost loop 243 finishes execution, the algorithm then scans the AEL 246 to find another edge bordering one of the polygons bordered by this edge with matching pg1 or pg2 values. This is to determine if there are any subsequent 'next edges' corresponding to the current edge. Once this scan 246 is complete, control is then passed back up to the top of this loop 224, where the check is made to see if a next edge was found.

At this point, the algorithm picks up at a point where control is passed when at the beginning of the second loop (the first being the main loop) a check is made to see if the current edge points to nothing 22, or if the current ylevel scan line is larger than the top scan line on the screen, (viewport). If either of these are true control is passed there to prepare the AEL and the edges in it for the next scan line. The first step is to discard old edges in the AEL 248, removing all edges for which ymin equals the current ylevel scan line. Next, for each edge in the AEL 250, increment xatymax, x, y, z, r, g, b, pu, and pv. Since the above increments of the xatymax values may have unsorted the list, the AEL needs to be sorted 252 based on the xatymax values. Since it is not likely that the list has actually become unsorted, or that if it did, the edges should not be far from the correct sorted positions, a few passes using a bubble-sort algorithm should sort the list quickly enough.

As the final step 254 inside the main mapping loop, a check must be made to see if the mapping is done. This may happen if the user has pressed the ESCAPE key, or if the current y scan line level has dropped below either the bottom of the mesh in screen coordinates or the bottom scan line on the screen (viewport). If none of these are true, the current scan line ylevel is decremented by 1 and control is passed back to the beginning of the main loop where all edges with ymax equal to ylevel are inserted into the AEL. If any of these are true, the mapping is terminated, all temporary data structures are freed 256, and control is returned to the 3-D CAD system 258. Assuming that the user allowed the mapping to finish, a surface with locally dimensionally correct mapped texture is displayed on the graphic CRT 10 of the computer. Accordingly, polygonal elements of the three-dimensional mesh will have mapped therein an identical number of texture pixels as are contained within their corresponding 2-D polygonal elements in the pattern piece mesh when this mesh is positioned upon the texture repeats making up the 'marker'. If the 3-D surface exhibits Gaussian curvature, some of the 2-D mesh polygons may be smaller than their corresponding 3-D elements, and some may be larger, due to the global strain minimization technique used by the flattening process. As a result, polygons that have a 2-D projection with smaller surface area than in 3-D will have fewer texture pixels spaced more widely apart across their 3-D surfaces when mapped. The inverse is true of those 3-D polygons that have a 2-D projection with greater surface area. If the 3-D polygon is being viewed at an oblique angle, its projection onto the 2-D screen space may also have considerably less surface area than it has in actual 3-D space, with the result that the texture pixels mapped to this area also are more closely spaced. This, along with the shading computation that attenuates the color of the texture pixels mapped to this polygon, is what imparts a 3-D appearance to the surface that is projected onto the screen of the graphic CRT, providing a visually and dimensionally correct display of the object.

The invention described herein for accurately applying 2-D bitmap images as textures to 3-D surfaces while retaining the local dimensional integrity of the image has been found to be a very useful tool for creating accurate, realistic computer-generated 3-D representations of textiles, apparel, footwear, upholstered furnishings, automotive interiors including seats, interior design, and home fashions.

The foregoing detailed description has been given for clearness of understanding only and no unnecessary limitations should be understood therefrom as some modifications will be obvious to those skilled in the art without departing from the scope and spirit of the appended claims.

I claim:

1. In a computer-aided design system, a method for mapping two-dimensional pattern images onto a three-dimensional surface having a three-dimensional topology displayed on a graphic display, comprising:

generating a three-dimensional mesh conforming to the topology of the three-dimensional surface, said mesh including lines intersecting at nodal points, said lines forming polygonal elements having a given configuration between said nodal points;

converting said three-dimensional mesh to a two-dimensional pattern mesh, said two-dimensional pattern mesh having a pattern outline, a plurality of polygons corresponding to said polygonal elements, each of said polygons having edges directly corresponding to the distance between nodal points defined by the three-dimensional topology of the surface;

generating a bitmap image corresponding to the two-dimensional pattern image to be mapped, said bitmap image including a plurality of texture pixels;

orientating said two-dimensional pattern mesh upon said bitmap image of the pattern image such that said pattern outline is orientated relative to the pattern image to form a bitmap pattern piece image; and mapping said bitmap pattern piece image to the displayed three-dimensional surface according to the configuration of said polygonal elements of said three-dimensional mesh to form a dimensionally correct image of the pattern image on the displayed three-dimensional surface, said mapping of said bitmap pattern piece image including:

assigning each edge of said polygonal elements of said two-dimensional mesh to an edge structure corresponding to a positional relationship of said polygon to other polygons within said two-dimensional mesh defined by two-dimensional positional coordinates;

sorting said edge structure in descending order into an edge list based on said two-dimensional positional coordinates of said edge structure of a polygon;

scanning said edge list to locate two opposing edge structures of a polygon, said opposing edge structures of a polygon forming an edge span therebetween;

interpolating a number of pixels along said edge span based upon the length of said edge span, the length of said edge span corresponding to the three-dimensional topology of the surface; and mapping said texture pixels of said bitmap image onto said edge span based upon the number of interpolated pixels.

2. The method of claim 1 wherein said nodal points of said three-dimensional mesh are multiplied by a transformation matrix upon conversion to said two-dimensional pattern mesh correlating to rotations, translations, and scale transformations applied to the three-dimensional surface displayed on the graphic display.

3. The method of claim 1 further including recursively repeating said steps of interpolating and mapping of the length of said two opposing edge structures until said polygonal elements are filled with said texture pixels.

4. The method of claim 1 wherein said interpolating step comprises:
computing an actual pixel index in said bitmap image from said texture pixel along said edge span of said polygon in said two-dimensional pattern mesh, said actual pixel index corresponding to the three-dimensional topology of the surface whereby said actual pixel index determines a mapping position of said texture pixels of said bitmap image;
computing color components of said texture pixel along said edge span of said polygon, said color components being attenuated according to a light intensity falling on the corresponding polygonal element of said three dimensional surface.

5. The method of claim 1 wherein said scanning interpolating, and mapping steps are repeated for an adjacent polygon of said two-dimensional mesh until all polygons within said pattern outline are processed.

6. In a computer-aided design system, a method of mapping two-dimensional pattern images onto a three-dimensional surface displayed on a graphic display, comprising:
generating a three-dimensional mesh conforming to the topology of the three-dimensional surface, said mesh including lines intersecting at nodal points, said lines forming polygonal elements between nodal points, the distance between said nodal points corresponding to the three-dimensional topology of the surface;
converting said three-dimensional mesh to a two-dimensional pattern mesh, said two-dimensional pattern mesh having a pattern outline, a plurality of polygons corresponding to said polygonal elements, each of said polygons having edges corresponding to said lines between nodal points of said polygonal elements, the length of said edges directly corresponding to the distance between nodal points defined by the three-dimensional topology of the surface;
generating a bitmap image corresponding to the two-dimensional pattern image to be mapped, said bitmap image including a plurality of texture pixels;
orienting said two-dimensional pattern mesh upon said bitmap image of the pattern image such that said pattern outline is orientated according to the pattern image to form a bitmap pattern piece image thereby ensuring said pattern mesh is an accurate representation of said bitmap image; and
mapping said bitmap pattern piece image to the displayed three-dimensional surface according to the configuration of said polygonal elements of said three-dimensional mesh to form a dimensionally correct image of the pattern image on the displayed three-dimensional surface by interpolating a number of pixels along an edge span of said polygonal elements extending between opposing edges of said polygon and mapping said texture pixels of said bitmap image onto said edge span in correspondence to said interpolated pixels until said polygonal elements are filled with said texture pixels and all of said polygonal elements within said pattern outline have been interpolated and mapped, said edge span having a defined length corresponding to the three-dimensional topology of the surface, each edge span having an identical number of pixels interpolated and mapped thereto.

7. The method of claim 6 wherein for each texture pixel interpolated and mapped a color component is computed corresponding to a light intensity falling on the polygonal elements of said three-dimensional surface.

8. The method of claim 7 wherein said mapping step includes the steps of:
assigning each edge of each said polygon with said pattern outline to an edge structure corresponding to the positional relationship of said polygon, each edge being assigned only once;
sorting said edge structure corresponding to the position of said polygon in descending order into an edge list based on the two-dimensional positional coordinates of said edge structure;
scanning said edge list to locate two opposing edge structures of one polygon, said opposing edge structures of said one polygon forming an edge span therebetween;
interpolating a number of pixels along said edge span based upon the length of said edge span corresponding to the three-dimensional topology of the surface;
mapping said texture pixels of said bitmap image onto said edge span in one-to-one correspondence to said interpolated pixels; and
recursively repeating said steps of interpolating and mapping for each edge span over the length of said two opposing edge structures until said polygonal element is filled with corresponding texture pixels.

9. In a computer-aided design system, a method of mapping a bitmap pattern piece image corresponding to a two-dimensional pattern image, the bitmap image including a plurality of texture pixels, onto a three-dimensional mesh conforming to the topology of a three-dimensional surface displayed on a graphic display, the three-dimensional mesh represented by a two-dimensional pattern mesh having a pattern outline, a plurality of polygons configured proportionate to the topology of the three-dimensional surface, each of the polygons having edges with a length directly corresponding to the three-dimensional topology, comprising:
assigning each edge of said polygons of said pattern mesh to an edge structure corresponding to a positional relationship of said polygonal relative to other polygons within the two-dimensional pattern mesh defined by two-dimensional positional coordinates;
scanning said edge structure to locate two opposing edges of a single polygon, said opposing edges of said single polygon forming a plurality of edge spans therebetween;
interpolating a number of pixels along one of said edge spans based upon a length of said edge span relative to the three-dimensional topology of the surface represented by a configuration of said single polygon, said interpolation accomplished by computing an actual pixel index in the bitmap image corresponding to the texture pixels along said edge span to determine a mapping position of said texture pixels according to the three-dimensional topology and computing color components of the texture pixel along said edge span, said color components being attenuated according to the three-dimensional topology and a light intensity falling on the three-dimensional surface corresponding to said edge span;

mapping said texture pixels of said bitmap image onto said edge span in correspondence to said interpolated pixels; and recursively repeating said interpolating and mapping steps until each edge span has been mapped and recursively repeating said scanning, interpolating and mapping steps until each polygon within the pattern outline has been filled with the texture pixels thereby forming a dimensionally correct image of the pattern image on the displayed three-dimensional surface based upon the two-dimensional pattern mesh, the two-dimensional pattern mesh determining a texture mapping to the three-dimensional surface.

10. The method of claim 9 and further comprising the step of sorting said edge structure is descending order into an edge list based on the two-dimensional positional coordinates of said polygon.

11. The method of claim 10 and further comprising the step of determining and sorting each edge structure of said edge list corresponding to aligned rows of polygons such that said polygons are interpolated and mapped by aligned rows of polygons.

* * * * *